United States Patent Office 3,162,571
Patented Dec. 22, 1964

3,162,571
METHOD OF PROTECTING PLANTS AND ORGANIC MATTER WITH SUBSTITUTED TRIAZENES
Frederic H. Adams, Bound Brook, N.J., and Donald P. Wright, Jr., New Canaan, Conn., assignors to American Cyanamid Company, Stamford, Conn., a corporation of Maine
No Drawing. Original application Sept. 24, 1959, Ser. No. 841,948. Divided and this application July 6, 1962, Ser. No. 213,839
8 Claims. (Cl. 167—30)

The present invention relates to new triazene compounds and to their use for agricultural purposes. More particularly, the invention relates to new 1-(acylaminoaryl)-3,3-disubstituted triazenes and to their use in deterring or preventing insects, mammals, birds, and allied pests from feeding on the foliage of plants, wool, cellulose and other organic matter.

In spite of the introduction of many new and powerful insecticides in recent years, the insect problem is still at hand. New insects are continually appearing, and the older ones in some cases have developed a resistance to insecticides, so that some insecticides are not nearly so effective as they were when first introduced.

An object of the present invention is to provide chemical compounds which when applied to plants will dissuade insects from feeding on the foliage of said plants.

Another object of the present invention is to provide chemical compounds which when applied to various materials such as wool, cellulose, or other organic matter will act as deterrents so that insects, mammals, e.g. rodents, birds and the like will refrain from feeding on and destroying or attacking such materials.

Another object of the present invention is to prevent the damage to stored products such as grain, dried legumes, fruit, etc. by making the container, i.e. box, bag and the like unappetizing to rodents or other pests.

Another object of the present invention is to provide a process whereby such materials may be protected from attack by insects and the like by making such materials unappetizing to such pests.

The above objects have been accomplished by preparing new chemical compounds which may be designated 1-(acylaminoaryl)-3,3-disubstituted triazenes. The new compounds of this invention have the following structural formula:

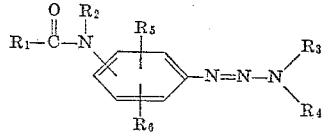

wherein $R_2$ represents hydrogen, phenyl or a lower alkyl radical, $R_2$ represents hydrogen or a lower alkyl radical, $R_3$ and $R_4$ represent an alkyl, hydroxyalkyl, aralkyl, cycloalkyl, or alkenyl radical and when $R_3$ and $R_4$ are taken together with the nitrogen atom they represent a heterocyclic radical such as morpholino, piperazino or piperidino, and $R_5$ and $R_6$ represent hydrogen, chlorine, a lower alkyl or a lower alkoxy radical.

The new triazene compounds may be readily prepared by coupling an aromatic diazonium salt of the general formula:

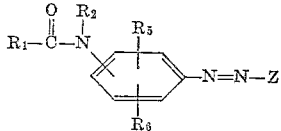

wherein $R_1$, $R_2$, $R_5$ and $R_6$ are as previously defined, and Z represents an acid group, for example, Cl, with an equivalent quantity of an amine of the formula:

wherein $R_3$ and $R_4$ have the meaning hereinbefore given.

The reaction to form the triazene compounds proceeds at low temperature. The coupling of the diazonium salt with the secondary amine is advantageously effected by bringing together aqueous solutions of the individual reactants in the presence of an alkaline medium which serves to bind the acid liberated by the coupling. The triazene is insoluble in the reaction medium, and may be separated therefrom with ease.

Among the N-acyl aromatic diamines which may be used as the diazonium components in preparing the compounds of this invention, there may be included the following: p-aminoacetanilide, p-aminoformanilide, p-aminopropioanilide, p-aminobutyranilide, p-aminovaleranilide, 4-amino-o-acetotoluidide, 4-amino-m-acetotoluidide, 4-amino-o-acetanisidide, 4-amino-2-ethylacetanilide, p-amino-N-methylacetanilide, p-amino-N-ethylacetanilide, p-aminobenzanilide, 4-amino-2-chloroacetanilide and 4-amino-2,5-diethoxybenzanilide.

The following amines are typical of the coupling components which may be employed in preparing the herein-described novel triazenes: dimethylamine, diethylamine, di-n-propylamine, di-isopropylamine, di-n-butylamine, di-isobutylamine, di-n-amylamine, di-n-hexylamine, N-methylethylamine, N-ethylpropylamine, dicyclohexylamine, N-isopropylcyclohexylamine, diallylamine, dibenzylamine, N-methylbenzylamine, piperidine, piperazine, morpholine, N-methylaniline, N-ethylaniline and bis-(beta-hydroxyethyl)amine.

The novel compounds may be applied as water solutions or organic liquid solutions. Various formulations may be prepared using a variety of extenders, inert diluents, toxicants and the like as is well known to those skilled in the art. In general, we have found that the new compounds are effective antifeeding compounds when employed in concentrations ranging from about .003% to 5.0% by weight. With insects the preferred range has been found to be from about .003% to about .1%, whereas with rats the preferred range is from about .05% to about 5%.

This application is a division of S.N. 841,948, filed September 24, 1959, now abandoned.

The following examples further illustrate the invention but are not to be construed as limiting the same.

EXAMPLE 1

*1-(p-Acetamidophenyl)-3,3-Dimethyltriazene*

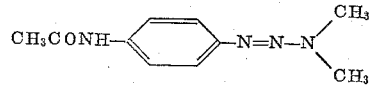

A solution of 15 parts (0.1 mole) of p-aminoacetanilide in 200 parts of water containing 11.0 parts (0.3 mole) of hydrochloric acid is diazotized at 5° C. by adding a solution of 6.9 parts (0.1 mole) of sodium nitrite in 15 parts of water. The solution of diazotized p-aminoacetanilide is added to a solution of 20 parts of sodium acetate and 20 parts (0.105 mole) of 25% dimethylamine in 250 parts of water at 0° C. When the addition of the diazo is finished, 20 parts of sodium carbonate are added to give an alkaline reaction to phenolphthalein indicator paper. After stirring until the coupling reaction is essentially complete (about 30 minutes), the crystalline precipitate is filtered off and washed with water. After drying at 50° C., about 19 parts of product melting at 158° C. are obtained.

EXAMPLE 2

*1-(p-Acetamidophenyl)-3,3-Diethyltriazene*

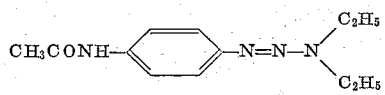

A solution of diazotized p-aminoacetanilide (0.1 mole) prepared as in Example 1 is slowly added to a solution of 14.6 parts (0.2 mole) of diethylamine and 10 parts of sodium carbonate in 250 parts of water at 10° C. while maintaining an alkaline reaction on phenolphthalein paper by simultaneously adding a solution of 10 parts of sodium carbonate in 50 parts of water. After stirring until the coupling reaction is essentially complete, the product is isolated by filtering, washed with water, dried at 55° C. (24 parts, M.P. 108–109° C.) and crystallized from alcohol. The crystals melt at 110–111° C.

EXAMPLE 3

*1-(p-Acetamidophenyl)-3,3-Di-n-Butyltriazene*

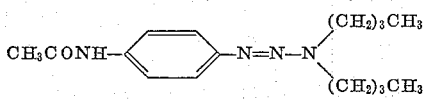

A solution of diazotized p-aminoacetanilide (0.1 mole) prepared as in Example 1 is slowly added to a solution of 14.2 parts (0.11 mole) of di-n-butylamine and 30 parts of sodium carbonate in 250 parts of water at 8–10° C. Additional sodium carbonate is added to maintain an alkaline reaction on phenolphthalein paper. After stirring until the coupling reaction is essentially complete, the product is isolated by filtering, washed with water, dried in vacuo at room temperature (26 parts, M.P. 70–73° C.), and recrystallized from ethanol. The crystalline material melts at 74–75° C.

EXAMPLE 4

*1-(p-Acetamidophenyl)-3,3-Bis-(Beta-Hydroxyethyl)Triazene*

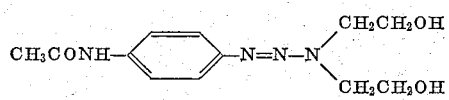

A coupling reaction is carried out as in Example 2 substituting an equivalent quantity (0.11 mole) of diethanolamine for the di-n-butylamine. The crude product (about 22 parts), M.P. 139–140° C., is crystallized from ethanol. The purified product melts at 140–141° C.

EXAMPLE 5

*1-(p-Acetamidophenyl)-3,3-Oxydiethylenetriazene*

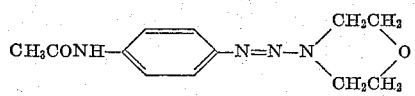

A coupling reaction is carried out as in Example 3 substituting an equivalent quantity (0.11 mole) of morpholine for the di-n-butylamine. Purification of the crude product (21.1 parts, M.P. 181–183° C.) by crystallization from ethanol gives a crystalline material melting at 185–187° C.

EXAMPLE 6

*1-(p-Acetamidophenyl)-3,3-Pentamethylenetriazene*

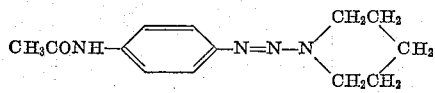

The procedure of Example 3 is followed substituting an equivalent quantity (0.11 mole) of piperidine for the di-n-butylamine. Purification of the crude produce (26.9 parts, M.P. 169–170° C.) by crystallization from ethanol gives a crystalline material melting at 177–178° C.

EXAMPLE 7

*1-(p-Acetamidophenyl)-3-3-Diallyltriazene*

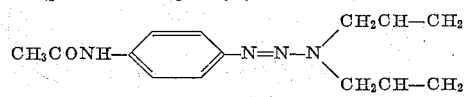

A solution containing 0.1 mole of diazotized p-aminoacetanilide, prepared as in Example 1, is added to a solution of 15 parts (0.155 mole) of diallylamine and 20 parts of sodium acetate in 750 parts of water at 10° C. A solution of 30 parts of sodium carbonate in 125 cc. of water is added slowly until an alkaline reaction is obtained on phenolphthalein test paper. When the coupling reaction is essentially complete, the product is isolated by filtering, washed with water and dried (29.7 parts, M.P. 80–81° C.), and crystallized from ethanol. The crystalline material melts at 91–92° C.

EXAMPLE 8

*1-(pAcetamidophenyl)-3-Cyclohexyl-3-Isopropyltriazene*

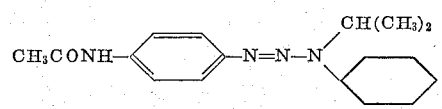

A solution containing 0.05 mole of diazotized p-aminoacetanilide, prepared as in Example 1, is added to a solution of 14.1 parts (0.1 mole) of N-isopropylcyclohexylamine and 10 parts of sodium acetate in 500 parts of water and 10 parts of glacial acetic acid at 10° C. A solution of 30 parts of sodium carbonate in 125 parts of water is added until an alkaline reaction on phenolphthalein paper is obtained. When the coupling reaction is essentially complete, the product is isolated by filtering, washed with water and dried (12.5 parts). M.P. 125–126° C. and when crystallized from 50% ethanol has a melting point of 131–132° C.

EXAMPLE 9

*1-(p-Acetamidophenyl)-3,3-Dicyclohexyltriazene*

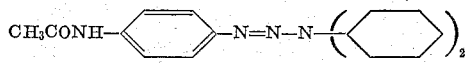

A solution containing 0.1 mole of diazotized p-aminoacetanilide, prepared as in Example 1, is added to a solution of 27 parts (0.15 mole) dicyclohexylamine in 1,000 parts of water and 20 parts of glacial acetic acid at 10° C. A solution of 45 parts of sodium carbonate and 175 parts of water is slowly added until an alkaline reaction on phenolphthalein paper is obtained. When the coupling reaction is essentially complete, the product is isolated by filtering, washed with water, dried (22.1 parts, M.P. 154–155° C.), and recrystallized from ethanol. The yellow crystalline material melts at 168–169° C.

EXAMPLE 10

*1-(p-Acetamidophenyl)-3-Benzyltriazene*

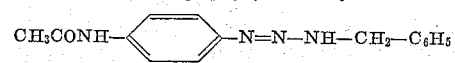

A solution of 22 parts of sodium carbonate in 200 parts of water is added slowly to a solution containing 0.2 mole of diazotized p-aminoacetanilide, prepared by the procedure of Example 1, until the diazo solution is no longer acid to Congo Red paper. The diazo solution is then added to a solution of 42.8 parts (0.4 mole) of benzylamine in 1,200 parts of water at 10° C. The remainder of the sodium carbonate solution is then added giving a positive test to phenolphthalein paper. When the coupling reaction is essentially complete, the product is isolated by filtering, washed with water, dried (39 parts, M.P. 100–101° C.), and crystallized from a mixture of acetone and water. The crystalline material melts at 90° C.

EXAMPLE 11

*1-(N-Methyl-p-Acetamidophenyl)-3,3-Dimethyltriazene*

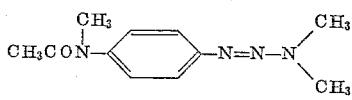

p-Amino-N-methylacetanilide (0.065 mole) is diazotized by a procedure similar to that used in Example 1. The diazo solution is added to a solution of dimethylamine (0.1 mole) in water at 10° C. Sufficient sodium carbonate is then added to give an alkaline reaction to phenolphthalein paper. When the coupling reaction is essentially complete, the reddish-brown oil is separated by extraction with ether. Evaporation of the ether leaves a residue which crystallizes on standing and melts at 75–77° C.

EXAMPLE 12

*1-(4-Acetamido-3-Tolyl)-3,3-Dimethyltriazene*

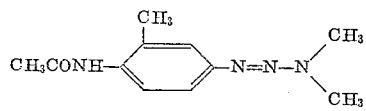

4-amino-2-methylacetanilide is diazotized and the diazo is coupled with dimethylamine in the presence of sodium carbonate by the procedure described in Example 2. The product, after crystallization from ethanol, melts at 160–161° C.

EXAMPLE 13

*1-(4-Acetamido-3-Methoxyphenyl)-3,3-Dimethyltriazene*

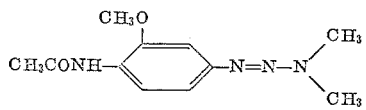

4-amino-o-acetanisidide is diazotized and the diazo is coupled with dimethylamine in the presence of sodium carbonate by the procedure described in Example 2. The product, after crystallization from ethanol, melts at 132–133° C.

EXAMPLE 14

*1-(p-Formamidophenyl)-3,3-Dimethyltriazene*

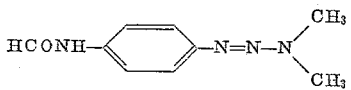

A solution of 6.8 parts (0.05 mole) of p-aminoformanilide in 200 parts of water containing 0.15 mole of hydrochloric acid is diazotized by a procedure similar to that used in Example 1. The solution of diazotized p-aminoformanilide is added to a solution of 10 parts of sodium acetate and 12.5 parts of 40% dimethylamine in 250 parts of water at 10° C. Sufficient sodium carbonate (about 9 parts) is slowly added to give an alkaline reaction to phenolphthalein indicator paper. After stirring until the coupling reaction is essentially complete, the solution is extracted with benzene. Petroleum ether is added to the benzene extract whereupon crystals are precipitated. The crystals are separated by filtration and purified by crystallization from a mixture of ether and petroleum ether. The product melts at 103–104° C.

EXAMPLE 15

*1-(p-Benzamidophenyl)-3,3-Dimethyltriazene*

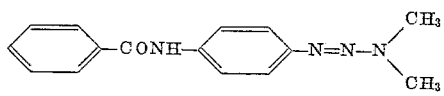

p-Aminobenzanilide (6.4 g., 0.03 mole) is diazotized by adding a solution of 0.03 mole of sodium nitrite to a solution of the amine in 0.09 mole of 5 N hydrochloric acid and 200 parts of water at 5° C. The solution of diazotized p-aminobenzanilide is added to a solution of 7.3 parts (0.16 mole) of dimethylamine in 220 parts of water. Sufficient sodium carbonate is added to give an alkaline reaction to phenolphthalein paper. The product is isolated by filtering, washed with water, dried at 60° C. (7.5 parts, M.P. 154–156° C.) and crystallized from ethanol. The crystals melt at 159–160° C.

EXAMPLE 16

*1-(p-Propionamidophenyl)-3,3-Dimethyltriazene*

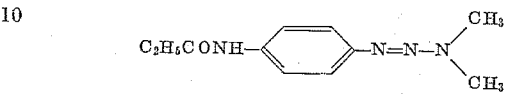

A solution containing 0.08 mole of diazotized p-aminopropionanilide, prepared by a procedure similar to that used in Example 1, is added to a solution of dimethylamine (0.165 mole) in water at 10° C. A solution of sodium carbonate is added simultaneously with the second half of the diazo solution to give a slight alkaline reaction on phenolphthalein paper at the completion of the addition of the diazo. After stirring until the coupling reaction is essentially complete, the product is isolated by filtering, washed with water, dried at 60° C. (15.9 parts, M.P. 121–122° C.) and crystallized from ethanol. The crystals melt at 124–125° C.

EXAMPLE 17

*1-(p-Propionamidophenyl)-3,3-Oxydiethylenetriazene*

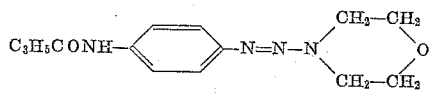

A coupling reaction is carried out by a procedure similar to that used in Example 16 substituting morpholine for the dimethylamine. Purification of the crude product (12.5 parts, M.P. 156–175° C.) by crystallization from ethanol gives a crystalline product melting at 158–159° C.

EXAMPLE 18

*1-(4-Acetamido-3-Chlorophenyl)-3,3-Dimethyltriazene*

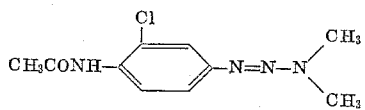

4-amino-2-chloroacetanilide is diazotized and the diazo is coupled with dimethylamine in the presence of sodium carbonate by the procedure described in Example 2. The product, after crystallization from ethanol, melts at 110–111° C.

EXAMPLE 19

*1-(4-Benzamido-2,5-Diethoxyphenyl)-3,3-Dimethyltriazene*

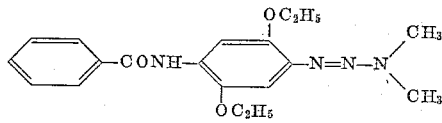

4-amino-2,5-diethoxybenzanilide is diazotized and the diazo is coupled with dimethylamine in the presence of sodium acetate and sodium carbonate by the procedure described in Example 1. The product, after crystallization from ethanol, melts at 124–125° C.

EXAMPLE 20

*1-(p-Acetamidophenyl)-3-Benzyl-3-Methyltriazene*

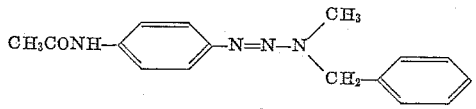

A solution containing 0.1 mole of diazotized p-aminoacetanilide, prepared as in Example 1, is added to a solution of 24.2 parts (0.2 mole) of N-methylbenzylamine and 30 parts of sodium acetate in 500 parts of water and 20 parts of glacial acetic acid at 10° C. A solution of 45 parts of sodium carbonate in 200 parts of water is added until an alkaline reaction on phenolphthalein paper is obtained. When the coupling reaction is essentially complete, the product is isolated by filtering, washed with water, dried (25.3 parts, M.P. 123–124° C.) and recrystallized from ethanol. The crystals melt at 124–125° C.

EXAMPLE 21

The antifeeding properties of the novel triazenes of this invention were determined by testing the compounds against the southern armyworm (*Prodenis eridania*) and the Mexican bean beetle (*Epilachna varivestis*) and also against rats. In the test involving the southern armyworm, the compounds were made up as solutions in 65% acetone and 35% water. Sieva lima beans leaves were dipped in the test solution. When dried they were infested with one third-instar (⅜″) armyworm larva per leaf and held for two days at 80° F. 60% relative humidity. Tests were read after two days' holding; observations being made of mortality, feeding damage, and migration of larvae from treated leaves. For the Mexican bean beetle the test procedure was the same as for the southern armyworm but one third-instar bean beetle per leaf was used. In the rat test, laboratory white rats were supplied with 100 grams of treated food in individual cages, three rats per dose being used. The rats were supplied water for drinking. Daily measurements were made of weight change of rats, amount of food consumed, and gross appearance of rats. Normal rats of the size used (90–100 grams) consumed 12–15 grams per day of untreated food. The data obtained are shown in the following table.

Table

| Compound | Southern Armyworm, Percent | | | | | Mexican Bean Beetle, Percent | | | | | Rats,[1] Percent | |
|---|---|---|---|---|---|---|---|---|---|---|---|---|
| | .1 | .03 | .01 | .003 | .001 | .1 | .03 | .01 | .003 | .001 | 1.0 | .2 |
| $CH_3-CO-NH-C_6H_4-N=N-N(CH_3)_2$ | none / 90 | T | T | T-L | S | T | T-L | L | M-S | M-S | 73 | 32 |
| $CH_3-CO-NH-C_6H_4-N=N-N(C_2H_5)_2$ | T | T-L | L | M-S | S | T | T-L | S | | | 75 | 42 |
| $CH_3-CO-NH-C_6H_4-N=N-N(C_4H_9)_2$ | T / 30 | T-L | M | S | | T | T-L | L | S | | 87 | 57 |
| $CH_3-CO-NH-C_6H_4-N=N-N(CH_2CH=CH_2)_2$ | T / 70 | T-L | L | S | | none | T | L | S | | 84 | 57 |
| $CH_3-CO-NH-C_6H_4-N=N-N(CH_2CH_2-OH)_2$ | T / 70 | T-L | M-S | S | | T | T | T-L | L-M | M-S | 50 | |
| $CH_3-CO-NH-C_6H_4-N=N-N(C_6H_{11})_2$ | T / 40 | T | L | M | S | T | T-L | L | M | S | 85 | 53 |
| $CH_3-CO-NH-C_6H_4-N=N-N(morpholino)$ | T / 70 | T | L | M | S | T | L | L-M | M-S | S | 73 | |
| $CH_3-CO-NH-C_6H_4-N=N-N(piperidino)$ | T / 20 | T | L | M | S | T | T | L | M | S | 80 | 46 |
| $CH_3-CO-NH-C_6H_4-N=N-N(CH_3)(CH_2C_6H_5)$ | T / 90 | T | L-M | S | | T | T | L-M | M-S | | 90 | 66 |
| $CH_3-CO-NH-C_6H_4-N=N-N(CH(CH_3)_2)(C_6H_5)$ | T | T | T-L | M | | T | L | M | S | | 82 | 52 |
| $H-CO-NH-C_6H_4-N=N-N(CH_3)_2$ | T | T | T-L | M | S | none | T-L | L | M | M-S | | |
| $C_2H_5-CO-NH-C_6H_4-N=N-N(CH_3)_2$ | T | T | T | L | M-S | T | T-L | L | S | | 70 | |

See footnote at end of table.

| Compound | Southern Armyworm, Percent | | | | | Mexican Bean Beetle, Percent | | | | | Rats,[1] Percent | |
|---|---|---|---|---|---|---|---|---|---|---|---|---|
| | .1 | .03 | .01 | .003 | .001 | .1 | .03 | .01 | .003 | .001 | 1.0 | .2 |
| Ph-CO-NH-C6H4-N=N-N(CH3)2 | T | T | T | L | M-S | L | M | S | ---- | ---- | ---- | ---- |
| | ---- | ---- | ---- | ---- | ---- | ---- | ---- | ---- | ---- | ---- | 81 | 48 |
| CH3-CO-N(CH3)-C6H4-N=N-N(CH3)2 | T | T | L-M | S | ---- | T | T | L | M | S | ---- | ---- |
| | 30 | 10 | ---- | ---- | ---- | ---- | ---- | ---- | ---- | ---- | 75 | 58 |
| C2H5-CO-NH-C6H4-N=N-N(morpholino) | T | T | T | T | M | T | L | M-S | S | ---- | ---- | ---- |
| | ---- | ---- | ---- | ---- | ---- | ---- | ---- | ---- | ---- | ---- | 81 | 38 |
| Ph-CO-NH-C6H2(OC2H5)2-N=N-N(CH3)2 | M | S | ---- | ---- | ---- | M-S | S | ---- | ---- | ---- | ---- | ---- |
| | ---- | ---- | ---- | ---- | ---- | ---- | ---- | ---- | ---- | ---- | 53 | ---- |
| CH3-CO-NH-C6H3(Cl)-N=N-N(CH3)2 | M | S | ---- | ---- | ---- | L | S | ---- | ---- | ---- | ---- | ---- |
| | ---- | ---- | ---- | ---- | ---- | ---- | ---- | ---- | ---- | ---- | 89 | 70 |
| CH3-CO-NH-C6H3(CH3)-N=N-N(CH3)2 | T | T-L | L-M | S | ---- | T | T | L | L-M-S | S | ---- | ---- |
| | 80 | ---- | ---- | ---- | ---- | ---- | ---- | ---- | ---- | ---- | 72 | ---- |
| CH3-CO-NH-C6H3(OCH3)-N=N-N(CH3)2 | T | M | M-S | S | ---- | T | L-M | M | M-S | S | ---- | ---- |
| | 60 | ---- | ---- | ---- | ---- | ---- | ---- | ---- | ---- | ---- | 87 | 56 |
| CH3-CO-NH-C6H4-N=N-N(CH3)2 (meta) | S | ---- | ---- | ---- | ---- | L-M | M | M-S | S | ---- | ---- | ---- |
| | ---- | ---- | ---- | ---- | ---- | ---- | ---- | ---- | ---- | ---- | 76 | 59 |

[1] Percent compound in diet.
T = Trace Feeding Damage = <5%.
L = Light Feeding Damage = 5–10%.
M = Moderate Feeding Damage = 10–20%.
S = Severe Feeding Damage = >20%.

Numbers indicate percent kill of insects or percent inhibition of feeding of rats.

EXAMPLE 22

A piece of white wool 2″ x 1″ was soaked in an acetone solution of the test compound and allowed to dry. It was then placed in a petri dish with 20 large (½″) larvae of the black carpet beetle (*Attagenus piceus*). The test was held for 14 days at 80° F. and observations made of feeding damage and the weight of the droppings (a measure of the amount of feeding). There were no deaths.

| | Soln. Conc., Percent | Damage | Corrected mg. Droppings Per 20 Larvae[1] |
|---|---|---|---|
| Untreated | ---- | Severe | 44.9 |
| 1-(p-Acetamidophenyl)-3,3-dimethyltriazene | .1 | None | 1.2 |
| | .03 | None | 1.7 |
| | .01 | Trace | 6.3 |
| | .003 | Severe | 25.2 |

[1] Corrected for 1.3 mg. of droppings per 20 starved larvae.

EXAMPLE 23

One-pound brown paper bags were soaked in acetone solutions of the test compound, dried, and ½-filled with whole wheat flour and sealed. Twenty-five adult lesser grain borers (*Rhizopertha dominica*) were added and observations made at 7 days.

| | Soln. Conc., Percent | Holes Bored in Bag |
|---|---|---|
| Untreated | | 7 |
| 1-(p-Acetamidophenyl)-3,3-dimethyltriazene | 1 | 0–2 |
| | .3 | 2 |
| | .1 | 2 |
| | .03 | 3 |
| | .01 | 5 |

We claim:
1. A method of protecting living plants and other organic matter from damage by insects, mammals and birds which infest living plants and other organic matter which comprises applying thereto in amounts which render such matter unappetizing to insects, mammals and birds which infest such matter a 1-(acylaminoaryl)-3,3-disubstituted triazene of the formula:

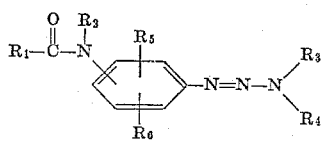

wherein $R_1$ is a member of the group consisting of hydrogen, phenyl and lower alkyl, $R_2$ is a member of the group consisting of hydrogen and lower alkyl, $R_3$ and $R_4$ are members of the group consisting of lower alkyl, hydroxy lower alkyl, benzyl, cyclohexyl, lower alkenyl and

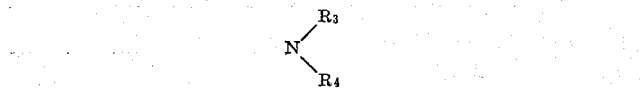

when taken together form a six-membered heterocyclic ring, and $R_5$ and $R_6$ are members of the groups consisting of hydrogen, chlorine, lower alkyl and lower alkoxy.

2. A method according to claim 1 in which the compound is 1-(p-acetamidophenyl)-3,3-dimethyltriazene.

3. A method according to claim 1 in which the compound is 1-(p-propionamidophenyl)-3,3-dimethyltriazene.

4. A method according to claim 1 in which the compound is 1-(p-propionamidophenyl)-3,3-oxydiethylenetriazene.

5. A method according to claim 1 in which the compound is 1-(p-acetamidophenyl)-3-benzyl-3-methyltriazene.

6. A method according to claim 1 in which the compound is 1-(4-acetamido-3-chlorophenyl)-3,3-dimethyltriazene.

7. A method according to claim 1 wherein the organic matter is wool.

8. A method according to claim 1 wherein the organic matter is cellulosic.

References Cited in the file of this patent

UNITED STATES PATENTS

| | | |
|---|---|---|
| 1,874,524 | Hentrich et al. | Aug. 30, 1932 |
| 1,882,562 | Glietenberg et al. | Oct. 11, 1932 |
| 2,191,259 | Pfaff et al. | Feb. 20, 1940 |
| 2,910,463 | Urbschat et al. | Oct. 27, 1959 |
| 2,911,336 | Urbschat et al. | Nov. 3, 1959 |